Patented Jan. 29, 1935

1,989,424

UNITED STATES PATENT OFFICE 1,989,424

ADHESIVE

George H. Osgood and Russell G. Peterson, Tacoma, Wash.; said Peterson assignor to said Osgood No Drawing. Application November 17, 1933, Serial No. 698,428

10 Claims. (Cl. 87—17)

Our invention relates to adhesives for use, especially, in the manufacture of veneer panels, and other commercial uses. The object of our invention is to produce an adhesive in which cellulose forms a part of the base and yet which does not require the large quantity of water commonly needed and which therefore dries quickly and does not stain the wood through the veneer.

In the past, several experimenters have attempted to make a commercial adhesive out of cotton, cotton linters, wood pulp, kapoc, and other cellulose bases, but have never been successful because this type of adhesive requires so much water to dilute it to a satisfactory fluidity that the panels glued therewith took days to dry, instead of hours, thus making the product impractical to use from a commercial manufacturing standpoint. Such glues also took a high percentage of caustic alkali which, with this large percentage of water, which penetrated the faces of the panels, stained the panels so badly that they were not usable.

We have now found by experiment that, by mixing or blending the above-mentioned materials with one or more hulls of seeds, such as pea hulls, bean hulls, coffee parchment, corn hulls, rice hulls, and the like, in amounts ranging from 85% of cellulose base and 15% hulls of seeds to 10% cellulose and 90% hulls of seeds, a satisfactory glue results.

The percentage of cellulose fiber and seed hulls may be varied in any amount to produce a glue that would give the characteristics desired, such as quickness of drying, moisture content, amount of staining, and strength. The particular proportions may be found by actual tests with the particular wood to be used but we find that to produce a suitable glue for use on fir in the Pacific Northwest, mixtures approximately as follows are satisfactory for average commercial conditions:

| | Per cent |
|---|---|
| Cotton | 75 |
| Pea hulls | 25 |
| | |
| Cotton linter | 60 |
| Pea hulls | 20 |
| Corn hulls | 20 |
| | |
| Wood pulp | 50 |
| Bean hulls | 25 |
| Coffee parchment | 25 |
| | |
| Rayon pulp (wood pulp) | 60 |
| Rice rulls | 10 |
| Pea hulls | 30 |

These are examples only and we do not wish to be understood that they are all the combinations or proportions which are practical and undoubtedly other woods will take different percentages and combinations. Nor do we wish to convey the idea that the above are the only materials which we use. Many other seeds' hulls can be used and any purified cellulose or nearly pure natural cellulose can be used with entirely satisfactory results.

The seed hulls are ground to about 8 to 24 mesh and are usually mixed with the cellulose to be used; then the mixture is steeped in a solution of from sixteen to twenty-four percent caustic soda, or other suitable caustic alkali; after which this steeped mass is pressed in a suitable machine to remove the excess liquid until the weight of the mass is about three times the original dry weight of the base materials. This mass is then subjected to the fumes of carbon bisulphide for from three to five hours and later diluted with water to the consistency desired.

It is, however, not necessary that the materials be mixed before steeping since they can be steeped separately and treated with carbon bisulphide separately and then blended at the time of dilution.

Having, therefore, described our invention, what we claim and desire to secure by Letters Patent, is:—

1. An adhesive base comprised of the reaction products of a mixture of cellulose fiber and one or more hulls of seeds treated with caustic alkali and carbon bisulphide.

2. An adhesive base comprised of the reaction products of a mixture of cotton and one or more hulls of seeds treated with caustic alkali and carbon bisulphide.

3. An adhesive base comprised of the reaction products of a mixture of wood pulp and one or more hulls of seeds treated with caustic alkali and carbon bisulphide.

4. An adhesive base comprised of the reaction products of a mixture of kapoc and one or more hulls of seeds treated with caustic alkali and carbon bisulphide.

5. The process of making an adhesive comprising blending cellulose with one or more hulls of seeds to form the base; and then treating this base with caustic alkali and carbon bisulphide.

6. The process of making an adhesive comprising blending cotton with one or more hulls of seeds to form the base; and then treating this base with caustic alkali and carbon bisulphide.

7. The process of making an adhesive comprising blending wood pulp with one or more hulls of seeds to form the base; and then treating this base with caustic alkali and carbon bisulphide.

8. The process of making an adhesive comprising blending kapoc with one or more hulls of seeds to form the base; and then treating this base with caustic alkali and carbon bisulphide.

9. The process of making an adhesive which comprises treating a mixture of the hulls of one or more seeds and a cellulose fiber with caustic alkali; and then extracting the excess liquid to approximately three times the dry weight of the base material; and then treating the mass with the fumes of carbon bisulphide.

10. The process of making an adhesive which comprises treating the hulls of one or more seeds with caustic alkali, and then extracting the excess liquid to approximately three times the dry weight of the base material, and then treating with the fumes of carbon bisulphide; and separately treating a cellulose fiber with caustic alkali, and then extracting the excess liquid to approximately three times the dry weight of the base material, and then treating with the fumes of carbon bisulphide; and then blending these two previously treated materials in the proper proportions to give the finished adhesive its required characteristics.

GEORGE H. OSGOOD.
RUSSELL G. PETERSON.